United States Patent [19]

Inoshiri et al.

[11] Patent Number: 5,805,718
[45] Date of Patent: Sep. 8, 1998

[54] CLOTHING AMOUNT MEASURING APPARATUS AND METHOD USING IMAGE PROCESSING

[75] Inventors: Ryo Inoshiri; Akira Yoshida, both of Nara-ken; Ziquan Hong, Tokyo-to, all of Japan

[73] Assignee: Sharp Kabushiki Kaisha, Osaka, Japan

[21] Appl. No.: 539,761

[22] Filed: Oct. 6, 1995

[30] Foreign Application Priority Data

Oct. 7, 1994 [JP] Japan ................................ 6-243904

[51] Int. Cl.⁶ ........................................................ G06K 9/00
[52] U.S. Cl. ............................ 382/111; 374/109; 374/45; 382/115
[58] Field of Search ...................... 382/111, 199, 382/115; 374/9, 109

[56] References Cited

U.S. PATENT DOCUMENTS

| 4,890,932 | 1/1990 | Kobayashi et al. ............. 374/109 |
| 5,228,779 | 7/1993 | Kon .................................. 374/109 |

FOREIGN PATENT DOCUMENTS

| 5-196425 | 8/1993 | Japan ............................ G01B 11/26 |
| 6-42943 | 2/1994 | Japan ............................ G01B 11/00 |

OTHER PUBLICATIONS

Sachio Yoneda, "New Clothes Hygiene", Chapter 7 Clothes and Physical Activities, pp. 125–126.

Primary Examiner—Jose L. Couso
Assistant Examiner—Matthew C. Bella

[57] ABSTRACT

In order to measure in a non-contact manner a clothing amount of a human being in a state in which the human body is clothed, a camera captures a subject including the human being. An image processing section recognizes a human body from images captured by the camera, and detects an area of the human body in the human body image. A radiation sensor detects a radiation heat quantity of an environment and a radiation heat quantity of a human body plus environment. A clothing amount calculating section obtains a position and an area of the human being in the real space, a surface temperature of the clothes on the human being, a skin temperature of the human being, an environmental temperature and so forth based on information from the image processing section and information from the radiation sensor, and calculates the clothing amount of the human being from the obtained values.

20 Claims, 8 Drawing Sheets

Fig.13a
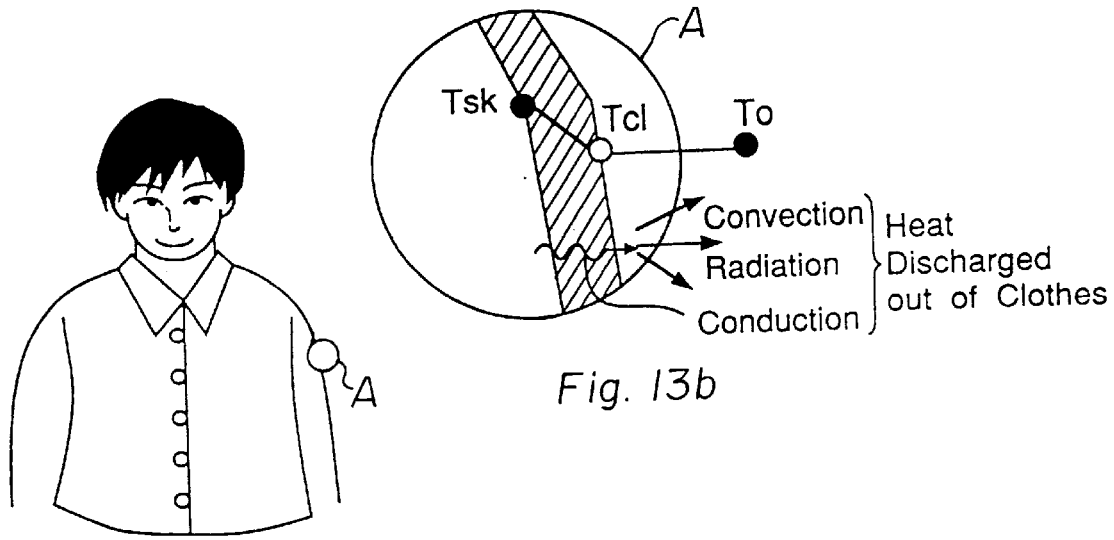
Fig. 13b
Fig.14
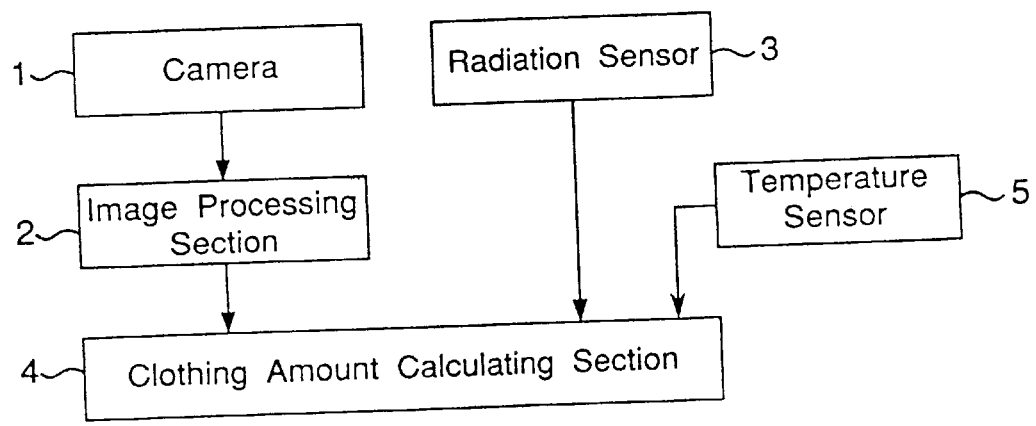

5,805,718

CLOTHING AMOUNT MEASURING APPARATUS AND METHOD USING IMAGE PROCESSING

BACKGROUND OF THE INVENTION

1. Field of the Invention

The present invention relates to a clothing amount measuring method for measuring a clothing amount that is one of parameters for use in indoor environment control and human information measurement, and to a clothing amount measuring apparatus using the clothing amount measuring method.

2. Description of the Prior Art

Clothes have not only the purpose of adorning human beings to improve their outside appearances but also the purpose of protecting human bodies from the nature to maintain human health. Therefore, it is very important to measure a clothing amount in studying human physiology and the like.

Weight of clothes has a close relation to a thermal insulation effect of the clothes (Sachio Yoneda, "New clothes hygiene", Chapter 7; "Clothes and physical activities", pp. 125–126). The weight of clothes enables us to a certain extent to judge whether one is clothed thickly or thinly, or to decide clothing adjustment conditions in response to variations of climate or changes of seasons and other factors.

Therefore, in measuring a clothing amount, a method of converting weight of clothes into a clothing amount has been conventionally taken.

However, the above-mentioned clothing amount measuring method has a problem that it has a degraded measurement accuracy since the important factors that the size of each human being influences the weight of clothes and that the material, configuration and sewing manner of clothes greatly influence the clothing amount are not taken into account.

There is a further method of measuring a clothing amount by putting clothes on a mannequin (thermal mannequin) provided internally with a heating element, controlling a quantity of generated heat, surface temperature, and so forth inside the mannequin by means of a computer, and measuring a thermal resistance of the clothes.

However, the above-mentioned method has a problem that it requires a large-sized expensive apparatus and is incapable of easily measuring the clothing amount.

Furthermore, each of the aforementioned methods can neither measure the clothing amount in a state in which the human being is clothed nor measure the clothing amount in a non-contact manner, meaning that the methods are incapable of measuring the clothing amount in conformity to the practice.

SUMMARY OF THE INVENTION

The object of the present invention is therefore to provide a clothing amount measuring apparatus and a clothing amount measuring method capable of measuring in a non-contact manner the clothing amount of a human being in a state in which the human being is clothed based on a position of the human being, an area of the human being, a surface temperature of the clothes on the human being, a skin temperature of the human being, and an environmental temperature.

In order to achieve the aforementioned object, the present invention provides a clothing amount measuring apparatus for measuring an amount of clothes on a human body in a non-contact manner, comprising:

an image pickup section for capturing a subject in a real space;

a radiation sensor for detecting a radiation heat quantity from the real space;

an image processing section for processing an image captured by the image pickup section, and upon recognizing that the subject is a human body, detecting a position and an area of the human body in the image; and a clothing amount calculating section for calculating a thermal resistance value of the clothes on the subject as a clothing amount when the subject is a human body based on an output from the image processing section and an output from the radiation sensor.

According to an embodiment, in the image processing section, a human body image recognizing unit recognizes a human body from an image captured by the image pickup section. Further, an image position and area detecting unit detects a position and an area of the human body in a human body image.

Then, in the clothing amount calculating section, a clothes surface temperature calculating unit calculates a clothes surface temperature based on the position and area of the human body in the human body image and a radiation heat quantity detected by the radiation sensor. Further, a skin temperature calculating unit calculates a skin temperature of the human body from a quantity of activity based on the human body image and an environmental temperature.

Then, a thermal resistance calculating unit calculates a thermal resistance of the clothes as a clothing amount from the clothes surface temperature, the skin temperature of the human body and the environmental temperature.

As described above, the clothing amount measuring apparatus of the present invention can measure in a non-contact manner the clothing amount in a state in which the human being is clothed. Therefore, the clothing amount can be measured in situ with high accuracy without being influenced by physique of a human being while taking into account the factors of the material, configuration, sawing manner and so forth of clothes influencing the clothing amount. Furthermore, there is no need to prepare any thermal mannequin, thermal mannequin control computer and so forth, allowing a compact inexpensive clothing amount measuring apparatus to be provided.

According to an embodiment of the present invention, the apparatus further comprises an environmental temperature acquiring section for obtaining an environmental temperature in a region captured by the image pickup section. Then, in the clothing amount calculating section, a real space position and area calculating unit calculates a position and an area of the human body in the real space based on the position and area of the human body in the human body image provided by the image processing section. Further, a radiation heat quantity calculating means calculates a radiation heat quantity of only the human body based on the radiation heat quantity detected by the radiation sensor and with reference to a result of the human body image recognition executed by the image processing section.

Then, the clothes surface temperature calculating unit calculates a clothes surface temperature by means of the environmental temperature obtained by the environmental temperature acquiring section, the position and the area of the human body in the real space, and the radiation temperature of only the human body.

In an embodiment of the present invention, the skin temperature calculating unit calculates a quantity of activity of the human being based on human body images captured continuously. Then, based on the quantity of activity of the human being and the environmental temperature, the skin temperature of the human body is calculated.

The present apparatus can measure the clothing amount with higher accuracy because it takes into account the state of activity of the human being.

Further, the present invention provides a clothing amount measuring method comprising the steps of: detecting an environmental temperature To by means of a temperature sensor; obtaining a radiation heat quantity V of a human body based on a radiation heat quantity detected by a radiation sensor; obtaining an actual position L of the human body and an area A of the human body based on a human body image from an image pickup means; obtaining a clothes surface temperature Tcl from the environmental temperature To, the radiation heat quantity V of the human body, the position L of the human body and the area A of the human body, according to the following equation:

$$\sigma(Tcl^4 - To^4) = (1/C) \cdot V \cdot L^2 / A$$

where $\sigma$ and C are constants;

obtaining a speed of movement of the human body based on the human body image; obtaining a quantity of activity of the human body based on the speed of movement of the human body; obtaining an amount of increase $\Delta T2$ of a skin temperature of the human body based on the quantity of activity of the human body; obtaining a skin temperature Tsk of the human body from the environmental temperature To and the amount of increase $\Delta T2$ of the skin temperature of the human body, according to the following equation:

$$Tsk = T1 + a \cdot To + b \cdot \Delta T2$$

where T1, a and b are constants; and obtaining a clothes thermal resistance value Icl as a clothing amount from the environmental temperature To, the clothes surface temperature Tcl and the skin temperature Tsk of the human body, according to the following equation:

$$Icl = (Tsk - Tcl) / \{\sigma(Tcl^4 - To^4) + hc(Tcl - To)\}$$

where hc is a constant.

According to the above-mentioned method, the clothing amount can be measured in a non-contact manner in a state in which the human being is clothed, from the position and area of the human being, the surface temperature of the clothes on the human being, the skin temperature of the human being, and the environmental temperature, thereby allowing the clothing amount to be measured with high accuracy at low cost.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13a illustrates a human body and FIG. 13b is a schematic view of the enlarged portion indicated in FIG. 13a showing a state in which a human being radiates heat; and FIG. 14 is a schematic block diagram of a modified example of the present invention.

DETAILED DESCRIPTION OF THE PREFERRED EMBODIMENTS

The present invention will be described in detail based on an embodiment thereof with reference to the accompanying drawings.

Figure 1:
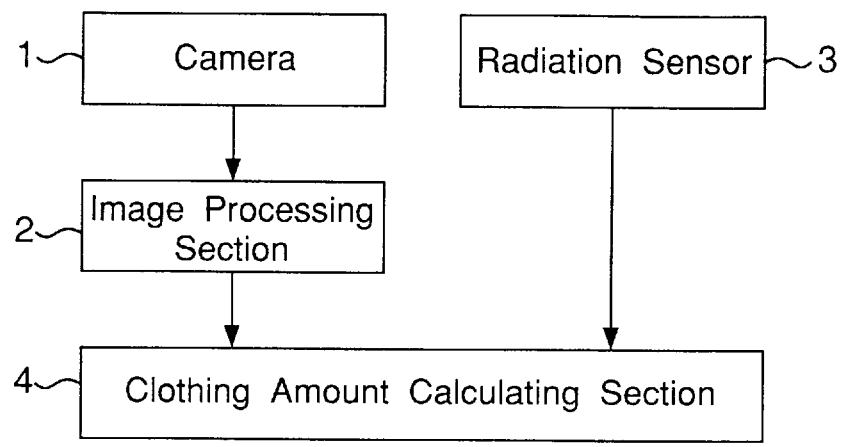
FIG. 1 is a schematic block diagram of a clothing amount measuring apparatus of the present invention.

FIG. 1 is a schematic block diagram of a clothing amount measuring apparatus of the present embodiment. The clothing amount measuring apparatus is comprised of a television camera (referred to merely as a camera hereinafter) 1 which serves as an image pickup section for capturing an image of a subject, an image processing section 2 which recognizes a human body image, i.e., an image including a human body captured by the camera 1, a radiation sensor 3 for detecting a radiation heat quantity of the subject and a peripheral region of the subject, and a clothing amount calculating section 4 which calculates a clothing amount based on an output from the image processing section 2 and an output from the radiation sensor 3.

Figure 2:
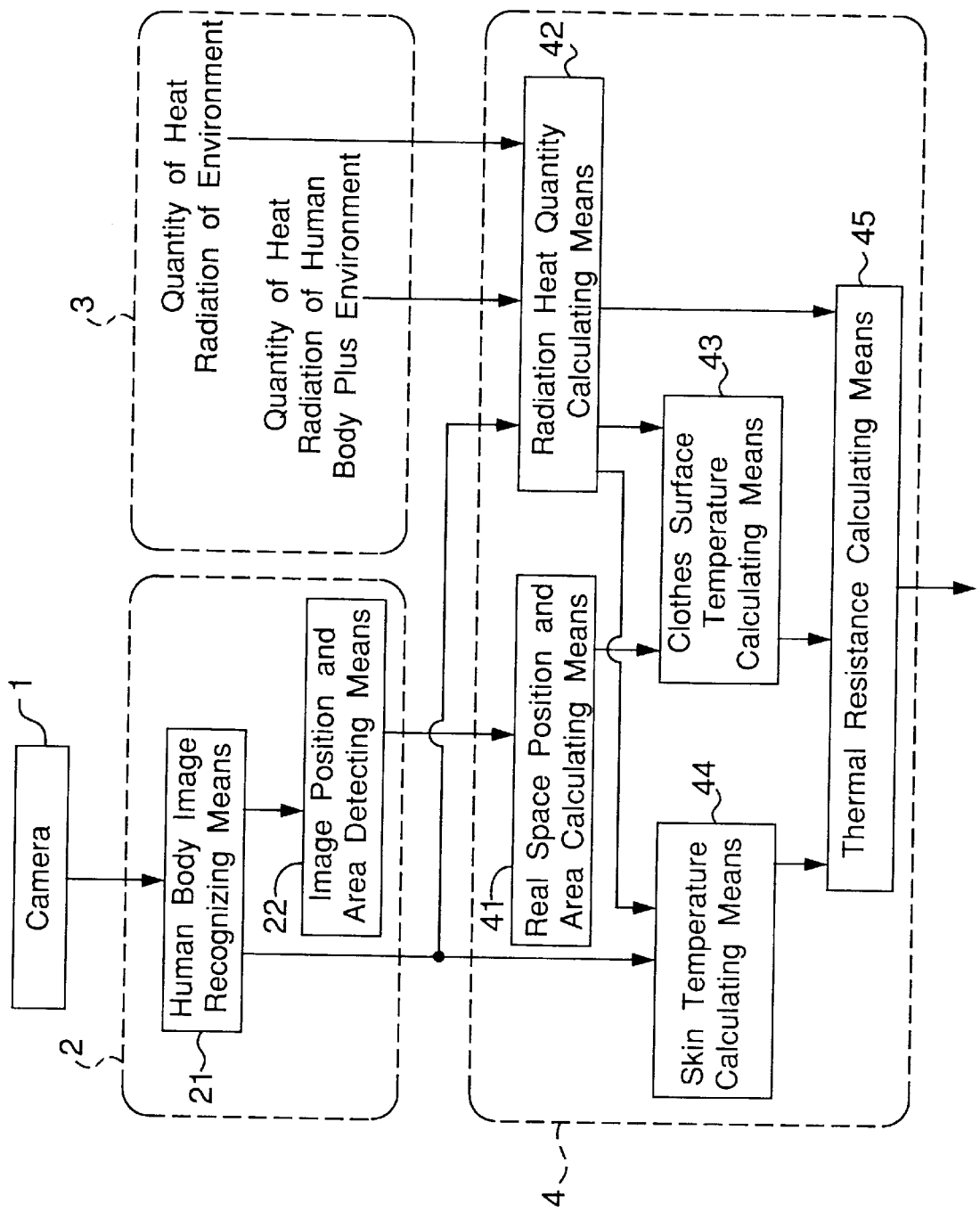
FIG. 2 is a block diagram showing a detail of an image processing section and a clothing amount calculating section shown in FIG. 1.

FIG. 2 is a detailed block diagram of the image processing section 2 and the clothing amount calculating section 4.

An image of a clothed human being is captured by the camera 1 and then output to the image processing section 2. The image processing section 2 recognizes the human body image based on image data from the camera 1 by a human body image recognizing means 21, and detects a position and an area of the human body in the human body image by an image position and area detecting means 22. The radiation sensor 3 detects a radiation heat quantity of the environment and a radiation heat quantity of the "human body plus environment".

Then, in the clothing amount calculating section 4, a position and an area of the human body in the real space is calculated by a real space position and area calculating means 41 from a detection result of the position and the area of the human body in the human body image from the image processing section 2. Meanwhile, a radiation heat quantity of only the human body is calculated by a radiation heat quantity calculating unit 42 from a detection result of each radiation heat quantity obtained by the radiation sensor 3. Then, a clothes surface temperature of the human body is calculated by a clothes surface temperature calculating unit 43 from calculation results of the position and the area of the human body in the real space and a calculation result of the radiation heat quantity of only the human body. Meanwhile, a quantity of activity of the human being is calculated by a skin temperature calculating unit 44 using human body images recognized by the human body image recognizing means 21 so as to calculate a skin temperature of the human body. Finally, a thermal resistance value of the clothes is calculated by a thermal resistance calculating means 45 based on the calculated clothes surface temperature, the skin temperature of the human body and the environmental temperature.

Thus the clothing amount is obtained by calculating the thermal resistance of the clothes of the human being.

Figure 3:
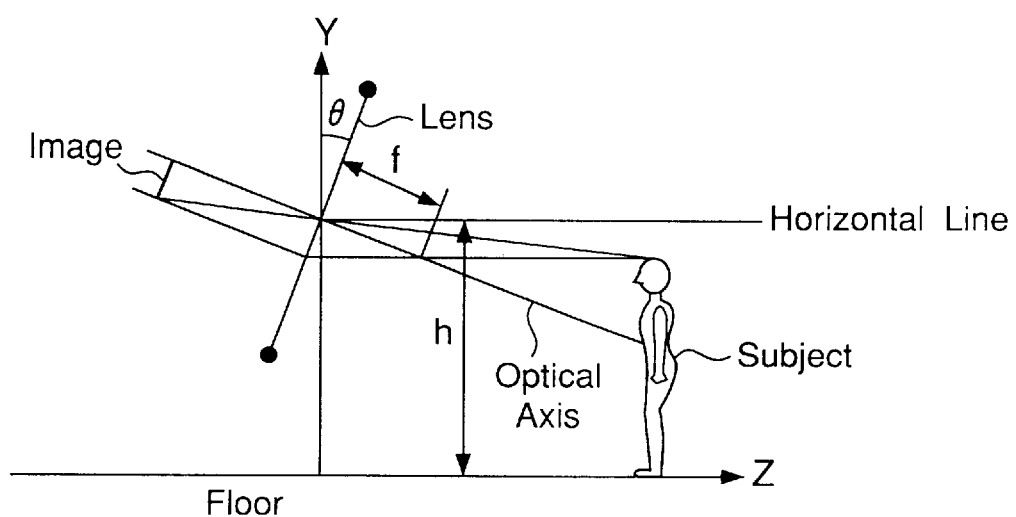
FIG. 3 is an explanatory view of a focal distance, an inclination angle and a height of a lens of a camera shown in FIG. 1.

FIG. 3 is a conceptual view of a focal distance f, an inclination angle θ and a height h of a lens in capturing an image by the camera 1. These values are preparatorily measured in installing the present clothing amount measuring apparatus.

A scale of a distance meter of the camera is set to the infinite value so that an image of the entire body of a standing human being can be picked up satisfactorily. When the image is out of focus in the above-mentioned operation, the defocus is ignored. The image processing section 2 recognizes the human body image from the image captured by the camera 1 thus installed.

Operations from the recognition of the human body image by the image processing section 2 to the calculation of the thermal resistance of the clothes by the clothing amount calculating section 4 will be described sequentially in detail below.

Figure 4:
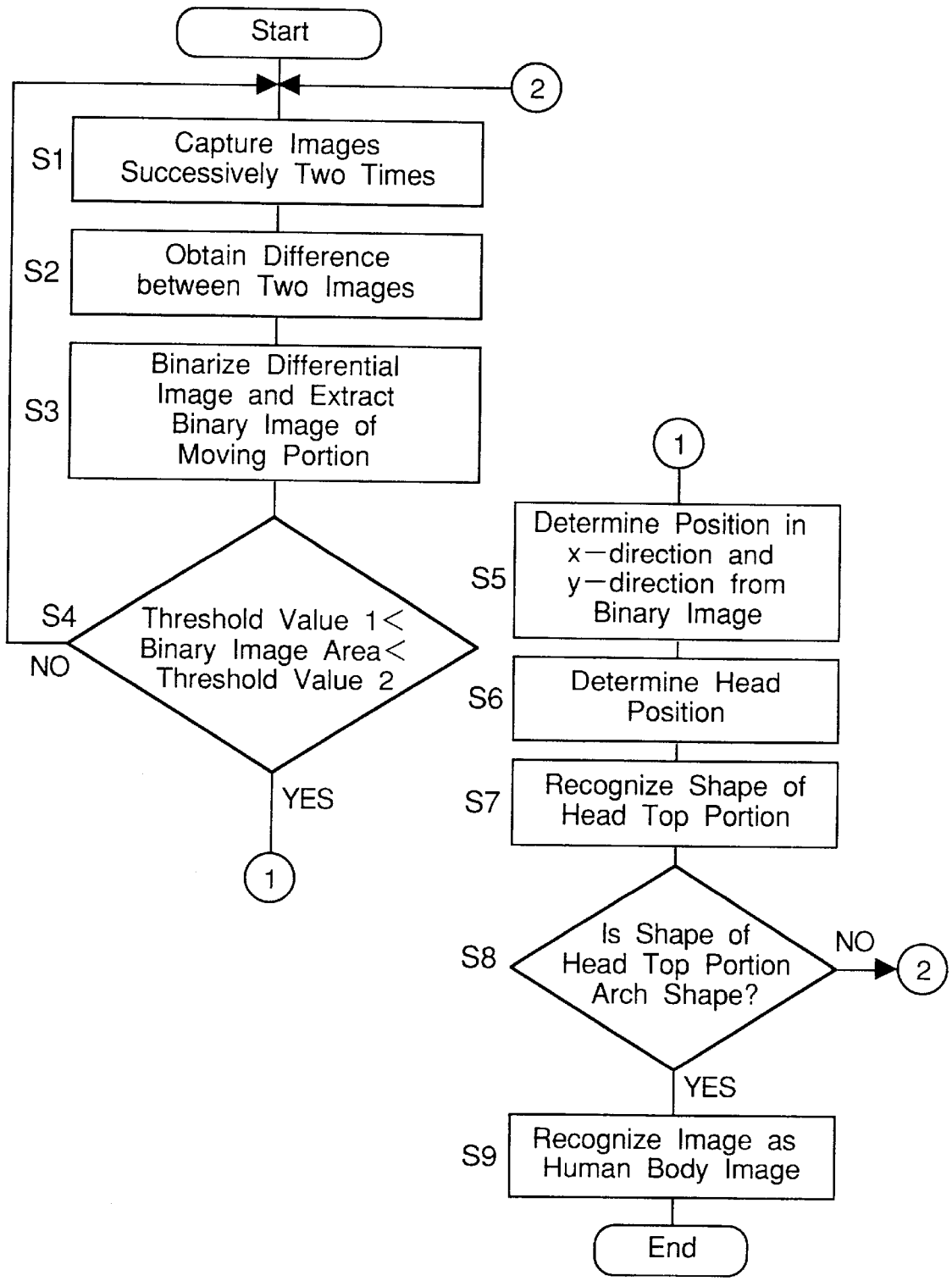
FIG. 4 is a flow chart of a human body image recognizing operation executed by a human body image recognizing means shown in FIG. 2.

FIG. 4 is a flow chart of a human body image recognizing operation executed by the human body image recognizing means 21 in the image processing section 2. The human body image recognizing operation will be described below with reference to FIG. 4.

In step S1, images from the camera 1 are captured continuously two times in order to recognize a moving object.

In step S2, a differential image of the two images is obtained by calculating an absolute difference between the captured two images.

In step S3, the differential image obtained in step S2 is binarized, so that a binary image of a moving portion is extracted. When a moving object exists in the captured two images, a great luminance difference takes place between the moving portions of both the images, and a luminance difference between the motionless portions such as backgrounds is approximately "0". Therefore, by taking a differential image between the two images, the moving portion can be extracted from the images.

In step S4, it is decided whether or not the area of the extracted binary image is within a range of from a threshold value 1 to a threshold value 2 set properly for the area of a human being taking into account his or her movement. Consequently, when the area is not within the above-mentioned range, the program flow returns to step S1 and then enters into processing of subsequent two images. Otherwise, when the area is within the above-mentioned range, the program flow proceeds to step S5.

That is, in the present step, it is decided that the moving portion is highly probably a human being when the area of the extracted moving portion is within the above-mentioned range, and the program flow proceeds to the next process recognizing the human being.

If the luminance difference of the moving portion is small in spite of the fact that a moving human being exists in the captured two images, the area of the obtained binary image, which is not within the above-mentioned range, is to be ignored.

However, the state of clothing of a human being does not change every time the human being moves. Therefore, the clothing amount that is one of parameters required for indoor environment control is sufficient as a parameter for indoor environment control if it is measured only when the image can be recognized as a standing (moving) human being.

Subsequently, a recognizing process for deciding whether or not the moving portion is a human being will be executed. It is to be noted that, in the present embodiment, the recognizing process of the human being will be executed based on the feature of the head portion of the human being.

In step S5, positions in an x-direction and a y-direction of the moving object are determined from the binary image extracted in step S3.

In step S6, the position of the head portion of the human being is determined based on the positions in the x-direction and the y-direction of the moving object.

In step S7, the shape of the head top portion is recognized.

In step S8, it is decided whether or not the shape of the recognized head top portion is an arch shape. Consequently, when the shape is not an arch shape, it is decided that the moving portion is not a human body, and the program flow returns to step S1. When the shape is an arch shape, the program flow proceeds to step S9.

In step S9, it is decided that the moving portion is a human body, and the human body image recognizing operation ends.

Next, the operations in step S5 through step S9 will be described more in detail.

In general, the head top portion of a human being has an arch-shape characteristic. In the case of a woman, her hair style is rather complicated with a headband or a permanent wave. However, regarding particularly the upper edge of the head top portion, there are very few hair styles that deform the arch shape. Furthermore, there may be a case where the head top portion is covered with a hat or the like. However, since the clothing amount is often measured inside a room, there are few cases where the head top portion is deformed by the hat or the like.

For the above-mentioned reasons, after extracting a figure corresponding to the head top portion from the extracted binary image (steps S5 and S6), recognition of the human being is executed by deciding whether the extracted figure is the head portion of a human being based on whether or not the upper edge of the extracted figure has an arch shape (steps S7 and S8).

In the present case, whether or not the upper edge of the extracted figure has an arch shape is decided based on whether or not a variation of curvature along the upper edge of the extracted figure is not greater than a specified value.

Figure 5:
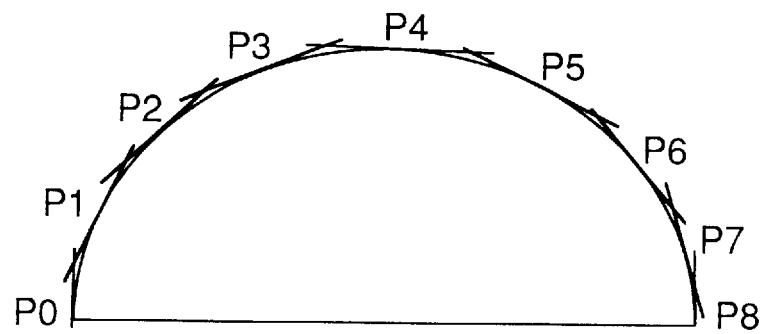
FIG. 5 is an explanatory view of distances between intersecting points of tangential lines in the case of an arch shape.
Figure 6:
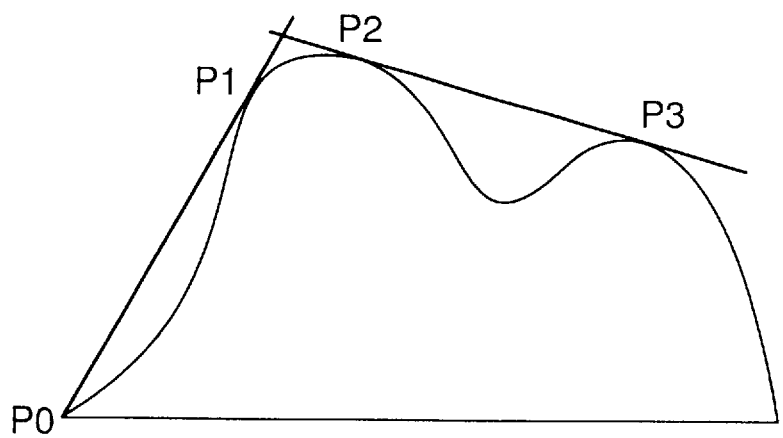
FIG. 6 is an explanatory view of distances between intersecting points of tangential lines in the case of a non-arch shape.

That is, when the upper edge of the figure has an arch shape, distances between intersecting points of tangential lines are short and the curvatures vary almost uniformly and in the same direction, as shown in FIG. 5. In contrast to the above, when the upper edge of the figure does not have an arch shape, distances between intersecting points of tangential lines are long and there are unstable or irregular variations of curvature as shown in FIG. 6. Therefore, an average distance between the intersecting points of as many tangential lines as possible drawn along the extracted figure is determined to be a curvature variation value, and when the curvature variation value is within a specified range, the extracted figure is determined to be the head top portion of a human being. Then, the binary image on which the extracted figure is based is recognized as an image of a human body. P0 to P8 and P0 to P3 are tangent points in FIG. 5 and FIG. 6, respectively.

When the human body in the image is recognized, subsequently a position and an area of the human body in the human body image are detected by the image position and area detecting unit 22 in the image processing section 2. Then, using the detected position and area of the human body in the human body image, the real space position and area calculating unit 41 in the clothing amount calculating section 4 calculates an actual position and an area of a silhouette (referred to merely as an area hereinafter) of the human body in the real space.

Operations from the detection of the position and the area of the human body in the human body image to the calculation of the position and the area of the human body in the real space will be described in detail below.

First of all, a width W of a head portion image is detected by the image position and area detecting unit 22 from the portion recognized as the head top portion in the human body image. Then, a distance Do between the camera 1 and the human being is calculated by the real space position and area calculating unit 41.

Figure 7:
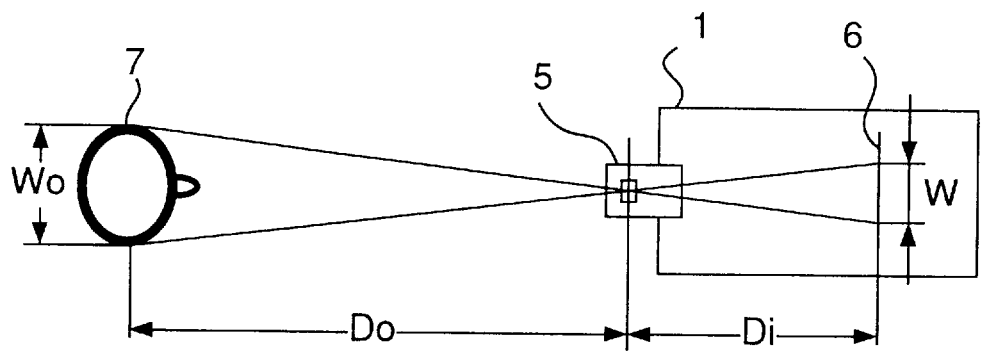
FIG. 7 is a diagram showing a relation between an actual head portion and a head portion image in a pick-up image.

As shown in FIG. 7, the width W of the head portion on an image formation surface 6 of the camera 1 and the distance Do between a lens 5 of the camera 1 and a head portion 7 in the real space have a relation expressed by Equation (1).

$$Do=(Wo/W) \cdot Di \qquad (1)$$

where

Wo: Width of the actual head portion 7

Di: Distance (constant) between the lens 5 and the image formation surface 6

Therefore, by supposing the width Wo of the actual head portion 7, the distance Do between the lens 5 and the head portion 7 (i.e., the actual position of the human body) can be calculated.

Then, height of the human being is calculated.

Coordinates of the head portion in the human body image are detected by the image position and area detecting unit 22. Then, the height of the human being is calculated by the real space position and area calculating unit 41 according to the theory of perspective projection from the coordinates of the head portion, focal distance f of the lens 5, inclination angle θ of the lens 5, and height h of the lens 5.

Figure 8:
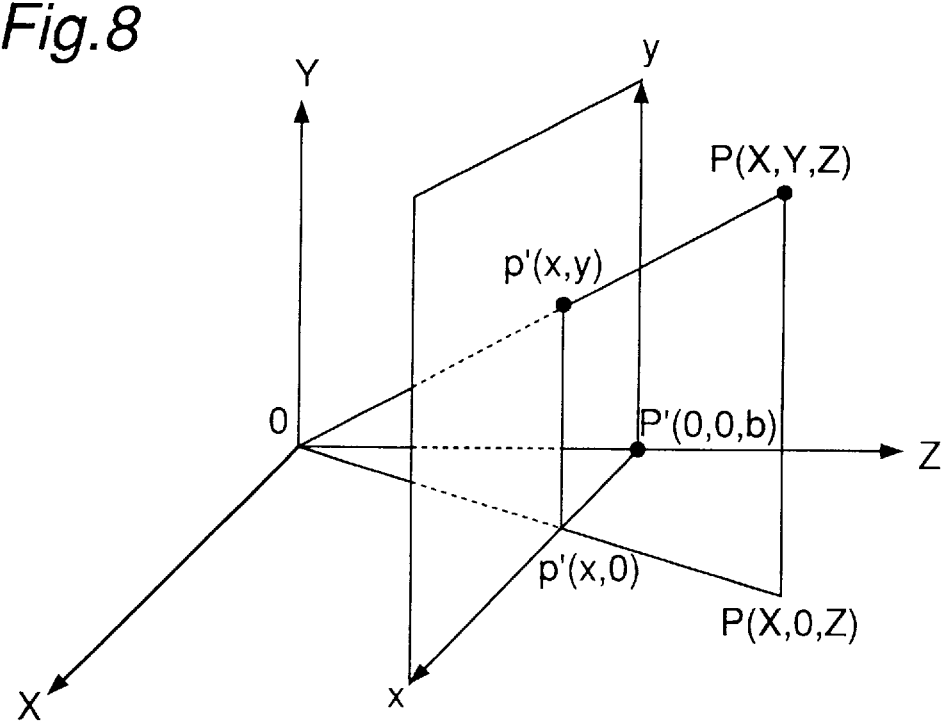
FIG. 8 is an explanatory view of perspective projection.

The theory of perspective projection will be described simply herein. As shown in FIG. 8, a point P(X,Y,Z) existing in a real three-dimensional space forms a perspective image p'=(x,y) in a two-dimensional image plane (xy-plane) parallel to an XY-plane having its origin at a point P' (0,0,b) located apart by a distance b from a view point (perspective center) O in a z-axis. In the above place, the point P in the three-dimensional space and the perspective image p' in the two-dimensional image plane have a simple geometrical relation as expressed by Equation (2) and Equation (3).

$$X=x(Z/b) \qquad (2)$$

$$Y=y(Z/b) \qquad (3)$$

When FIG. 7 is applied to FIG. 8, it can be considered that the inclination angle θ of the lens 5 and the height h of the lens 5 are both "0", that the focal distance f of the lens 5 is "b", and that the distance Do between the lens 5 and the head portion 7 is "Z". Therefore, using Equation (2) and Equation (3), the coordinates (X,Y,Z) of the head portion 7 in the real space can be calculated from the coordinates (x,y) of the head portion in the image plane, and the height of the human being can be calculated.

It is to be noted that the height h of the lens 5 and the inclination angle θ of the lens 5 are both "0" for the sake of simplicity of explanation, the same calculation as above can be performed in a similar manner when both of them are not "0".

The width Wo of the actual head portion is set as a constant in Equation (1). Therefore, the distance Do differs depending on whether the human being is an adult or a child according to a difference in width W of the head portion between the adult and the child in image formation image 6. However, as described above, it is postulated that the clothing amount is measured in the state in which the human being is standing, and therefore discrimination between the adult and the child can be achieved by his or her height. Therefore, if the height of the human being is calculated in a manner as described above and when the calculated height of the human being exceeds a specified threshold value, the change of the distance Do depending on whether the human being is an adult or a child can be corrected to a certain extent by changing the value of the width Wo of the actual head portion 7.

For instance, it is assumed that the threshold value of the height of the adult is 150 cm, that the width Wo of the head portion of the adult is 20 cm, and that the width Wo of the head portion of the child is 17 cm. In the case where a child is captured by the camera 1, when the distance Do is calculated on the assumption that the width Wo of the actual head portion is 20 cm in Equation (1), a value greater than the actual distance Do can be obtained. Subsequently, when the height of the human being is calculated according to Equation (3) using the obtained distance Do, the height increases by an error of the width Wo of the head portion. When the obtained value of the height of the human being, including the error, does not exceed 150 cm, the human being captured by the camera 1 is determined to be a child. Then, the value of the width Wo of the actual head portion is changed to 17 cm for child, and the distance Do is calculated again.

Thus, a correct distance Do is calculated based on the height of the human being.

The area of the human body in the real space is calculated in a manner as follows. From a contour of the human body image on the image formation surface 6, the number of pixels included within the contour is measured. Then, from the obtained number of pixels and the area of each pixel, the area of the human body on the image formation surface 6 can be calculated. Meanwhile, according to FIG. 8, a human body area s on the image formation surface 6 and the actual human body area S have a relation as expressed by Equation (4).

$$S=s(Z/b)^2 \qquad (4)$$

Therefore, by setting "Z" as the distance Do between the lens 5 and the head portion and setting "b" as the focal distance of the lens 5, the actual area of the human body can be calculated from Equation (4).

Thus, the area of the human body in the real space is calculated.

Next, calculation of a radiation temperature of only the human body executed by the radiation heat quantity calculating means 42 in the clothing amount calculating section 4 will be described in detail.

A detected radiation heat quantity is transmitted from the radiation sensor 3. At this time, when it is decided specified continuous times that the area of the binary image extracted in step S4 of the human body image recognizing operation executed by the human body image recognizing means 21 is not in the above-mentioned range, the radiation heat quantity transmitted from the radiation sensor 3 is interpreted as a "radiation heat quantity of an environment (background) where no human being exists." Then, in any other case, the radiation heat quantity is interpreted as a "radiation heat quantity of human body plus environment."

There is a possibility that the time when the radiation heat quantity is interpreted as the "radiation heat quantity of the environment where no human being exists" is considered as a time when a human being is existing in the image and is not moving by chance. However, human being will not fail to move a part of his or her body after a lapse of a certain time interval unless he or she intentionally does not move. Therefore, when no moving object is detected after a lapse of a certain time interval, the image captured in the time interval can be determined to be a background image.

When the "certain time interval" above-mentioned is assumed to be one minute, the radiation heat quantity detected by the radiation sensor 3 in the case where no moving object has not been detected for one minute is determined to be a "radiation heat quantity of the environment where no human being exists." The radiation heat quantity detected in the case where a moving object is detected is determined to be a "radiation heat quantity of the human body plus environment."

Figure 9:
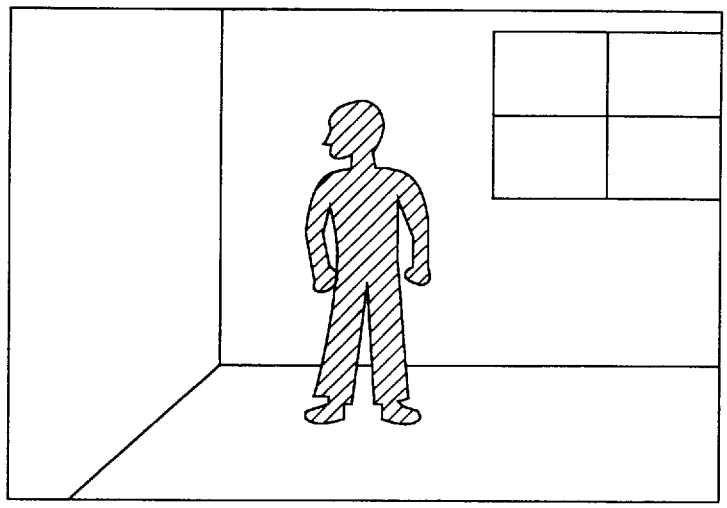
FIG. 9 is an exemplified background image including a human being captured by the camera shown in FIG. 1.

FIG. 9 shows an exemplified background image including a human being captured by the camera 1. When the "radiation heat quantity of the environment where no human being exists" is simply subtracted from the "radiation heat quantity of the human body plus environment", a "radiation heat quantity of the human being" will be obtained in a state in which a "radiation heat quantity of a background portion hidden behind the human being" is excluded. Therefore, the "radiation heat quantity of the background portion hidden behind the human being" must be compensated. That is, on the assumption that there is a uniformity in both the "radiation heat from the background portion hidden behind the human being" and the "radiation heat from a background portion that is not hidden behind the human being," a "radiation heat quantity V of only the human being" is calculated by adding a "radiation heat quantity Vhe of a portion of the environment corresponding to the human being" to a difference between a "radiation heat quantity Vo of the human body plus environment" and a "radiation heat quantity Ve of the environment", as expressed by the equation:

$$V = Vo - Ve + Vhe$$

Next, clothes surface temperature calculation executed by the clothes surface temperature calculating means 43 will be described.

The radiation sensor 3 located in a position apart by a distance L from the human being receives radiation heat from the human being and outputs a detection result. The output of the radiation sensor 3 is proportional to a heat source area (the area of the human body) A and inversely proportional to the square of the distance L from the radiation sensor 3 to the heat source. Therefore, Equation (5) holds.

$$\sigma(Tcl^4 - To^4) = (1/C) \cdot V \cdot L^2 / A \tag{5}$$

where $\sigma$: Constant

Tcl: Clothes surface temperature

To: Environmental temperature

C: Constant depending on the radiation sensor 3

V: Output value of the radiation sensor 3 attributed to only the human being In the present case, by setting the distance Do from the human being to the lens 5 of the camera 1 as the distance L from the human being to the radiation sensor 3 (i.e., the radiation sensor 3 is located in the vicinity of the lens 5) and using the "radiation temperature of the environment" as an environmental temperature To (i.e., the radiation sensor is used as a temperature sensor for detecting the environmental temperature in the present embodiment), a surface temperature Tcl of the clothes is calculated from Equation (5).

The heat source area A varies depending on whether the radiation sensor 3 is directed to the front of the human being or directed to a side of the human being. Therefore, it can be considered that the obtained clothes surface temperature Tcl varies depending on the posture of the human being. However, the output value V of the radiation sensor 3 attributed to only the human being and the area A of the human being are proportional to each other, and therefore Equation (6) can be obtained.

$$Vf/Af = Vs/As \tag{6}$$

where

Vf: Output value of the radiation sensor 3 attributed to only the human being in the case where the human being is facing frontward Af: Heat source area of the human being in the case where the human being is facing frontward Vs: Output value of the radiation sensor 3 attributed to only the human being in the case where the human being is facing sideward As: Heat source area of the human being in the case where the human being is facing sideward Equation (6) can be transformed into Equation (8).

$$Vf \cdot L^2 / Af = Vs \cdot L^2 / As \tag{7}$$

$$Tf \cdot C = Ts \cdot C \tag{8}$$

where

Tf: $\sigma(Tcl^4 - To^4)$ in the case where the human being is facing frontward Ts: $\sigma(Tcl^4 - To^4)$ in the case where the human being is facing sideward Therefore, Equation (5) holds regardless of the direction of the human being.

For the above-mentioned reasons, the clothes surface temperature Tcl is measured regardless of the posture of the human being.

Next, skin temperature calculation executed by the skin temperature calculating unit 44 will be described.

Figure 10:
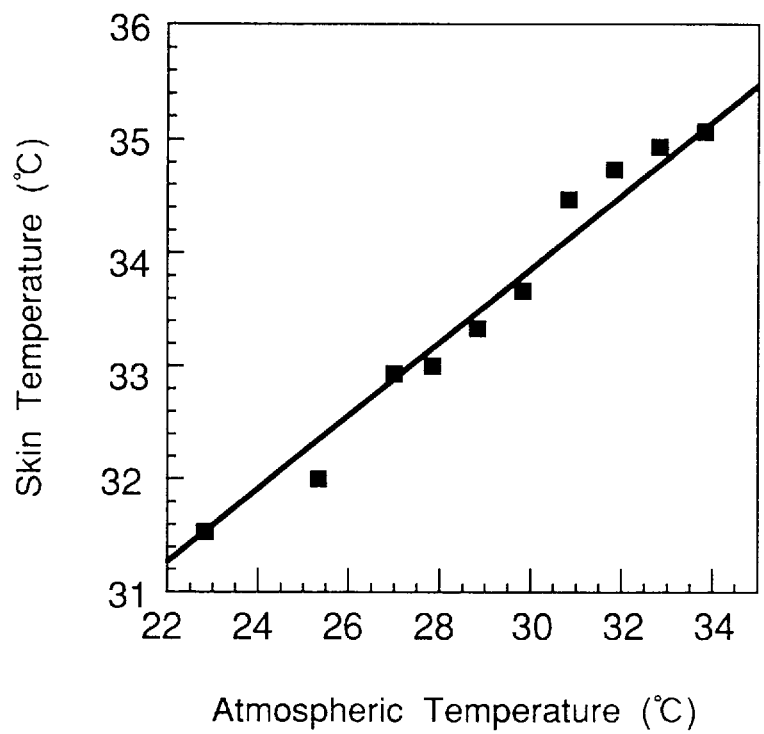
FIG. 10 is a graph showing a relation between skin temperatures of a human being and atmospheric temperatures.
Figure 11:
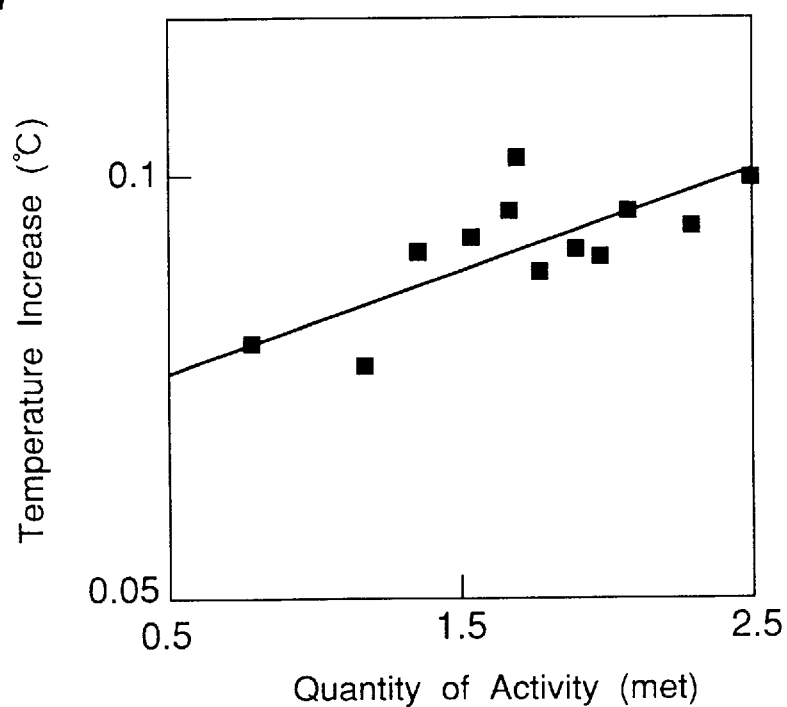
FIG. 11 is a graph showing a relation between amounts of increase of skin temperatures and quantities of activity of a human being.

FIG. 10 shows a relation between atmospheric temperatures and skin temperatures of a human being, where the atmospheric temperatures and the skin temperatures are proportional to each other. FIG. 11 shows a relation between quantities of activity of a human being and amounts of increase of the skin temperatures of the human being, where the quantities of activity and the amounts of increase of the temperatures are proportional to each other. Therefore, by correcting the skin temperature obtained from the atmospheric temperature (environmental temperature) with the quantity of activity of the human being, the skin temperature of the human being is correctly measured.

Figure 12:
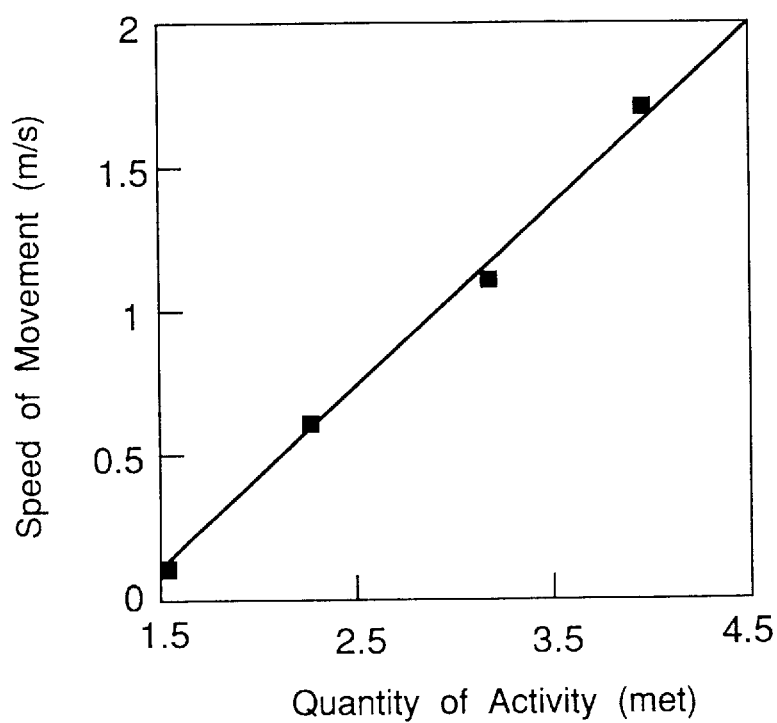
FIG. 12 is a graph showing a relation between movement speeds and quantities of activity of a human being.

The quantity of activity of the human being is detected from the images captured by the camera 1 in a manner as follows. That is, the image processing section 2 firstly uses the differential image that has been used in recognizing the human body image in the human body image recognizing operation so as to obtain a distance of movement of the human being between the position of the human being prior to the movement and the position of the human being after the movement in the differential image. Then a speed of movement of the human being is calculated from the distance of movement of the human being and an image capturing speed of the camera 1 at which images are successively captured. Meanwhile, the quantity of activity and the speed of movement of the human being have a proportional relation as shown in FIG. 12. Therefore, based on the proportional relation shown in FIG. 12, the quantity of activity is calculated from the calculated speed of movement.

Then, from the relation between the quantity of activity and the amount of increase of the skin temperature of the human being shown in FIG. 11, an amount of increase of the skin temperature corresponding to the calculated quantity of activity is calculated.

Equation (9) is an equation for calculating the skin temperature Tsk of the human being corrected with the quantity of activity of the human being.

$$Tsk = T1 + a \cdot To + b \cdot \Delta T2 \quad (9)$$

where

T1: Constant

To: Environmental temperature $\Delta T2$: Amount of increase of the skin temperature attributed to the activity of the human being a,b: Proportionality constants By substituting the calculated amount of increase $\Delta T2$ of the skin temperature attributed to the activity of the human being and the environmental temperature To (the "radiation temperature of the environment" in the present embodiment) into Equation (9), the skin temperature Tsk of the human being is calculated.

Finally, thermal resistance value calculation executed by the thermal resistance calculating unit 45 will be described.

FIGS. 13a and 13b schematically shows a form of heat emission of a human being. Every human being is always emitting heat. The form of heat emission is conduction, convection and radiation. In heat emission, clothes can be regarded as a resistance to the heat emitted from the skin of the human being as shown in FIG. 13b. That is, the heat emitted from the human being is reduced in temperature by the thermal resistance of the clothes as it is conducted through the clothes to reach the clothes surface, and then discharged from the clothes surface in the form of radiation and convection. Therefore, Equation (10) holds.

$$E1 + E2 = (Tsk - Tcl)/Icl \quad (10)$$

where

E1: Quantity of heat discharged from the human being in the form of radiation

E2: Quantity of heat discharged from the human being in the form of convection

Icl: Thermal resistance of the clothes

Further, the quantity of heat discharged from the human being in the form of radiation E1 is expressed by:

$$E1 = (1/C) \cdot V \cdot L^2 / A \quad (11)$$

while the quantity of heat discharged from the human being in the form of convection E2 is expressed by:

$$E2 = hc(Tcl - To) \quad (12)$$

where hc: Convectional heat transfer rate

Therefore, Equation (10) can be transformed into Equation (13) from Equation (11), Equation (12) and Equation (5).

$$\begin{aligned} Icl &= (Tsk - Tcl)/\{(1/C) \cdot V \cdot L^2/A + hc(Tcl - To)\} \\ &= (Tsk - Tcl)/\{\sigma(Tcl^4 - To^4) + hc(Tcl - To)\} \end{aligned} \quad (13)$$

In the present case, the convectional heat transfer rate hc exhibits the values as shown in Table 1.

TABLE 1

| State | Convectional heat transfer rate of human body surface (kcal/m²h °C.) |
|---|---|
| Sitting | 1.8–2.7 |
| Standing | 2.8–3.5 |
| Reclining | 2.9 |
| Bicycle pedalling (60 rpm) | 5.2 |

Accordingly, by using the convectional heat transfer rate hc for the state in which the human being is standing shown in Table 1 as the convectional heat transfer rate hc in Equation (13), using the value calculated by the clothes surface temperature calculating unit 43 according to Equation (5) as the clothes surface temperature Tcl, using the value calculated by the skin temperature calculating unit 44 according to Equation (9) as the skin temperature Tsk of the human being, and using the above-mentioned "radiation temperature of the environment" as the environmental temperature To, the thermal resistance Icl of the clothes, i.e., the clothing amount is calculated.

As described above, the image processing section 2 recognizes the human body image by the human body image recognizing unit 21 through obtaining a differential image from two successive images sequentially captured by the camera 1, and detects the position and the area of the human being in the human body image by the image position and area detecting unit 22.

The clothing amount calculating section 4 calculates the position Do and the area A of the human being in the real space by the real space position and area calculating unit 41 based on the position and the area of the human being detected by the image processing section 2. Meanwhile, the calculating section 4 takes in the radiation heat quantity from the radiation sensor 3 by the radiation heat quantity calculating unit 42 while discriminating the inputted radiation heat quantity between the "radiation heat quantity of the human body plus environment" and the "radiation heat quantity of the environment" according to the recognition result of the human body image executed by the image processing section 2, and then calculates the radiation heat quantity V of only the human being from both the radiation heat quantities.

Further, the clothing amount calculating section 4 calculates the clothes surface temperature Tcl by the clothes surface temperature calculating means 43 using the position L (Do) and the area A of the human body and the radiation heat quantity V of only the human being, and calculates the quantity of activity of the human being by the skin temperature calculating unit 44 based on the differential image obtained in the image processing section 2 so as to calculate the skin temperature Tsk of the human being. Then, the calculating section 4 calculates the thermal resistance Icl of the clothes, i.e., the clothing amount of the human body by the thermal resistance calculating unit 45 using the clothes surface temperature Tcl, the skin temperature Tsk of the human being and the environmental temperature To.

Therefore, the present embodiment obviates the need of a thermal mannequin, a thermal mannequin control computer and so forth, and allows a compact inexpensive clothing amount measuring apparatus to be provided.

Furthermore, according to the present embodiment, the clothing amount of the human being is calculated from the values of the area A, the clothes surface temperature Tcl, the skin temperature Tsk, and the radiation heat quantity V of the human being, the values measured in the state in which the human being is clothed. Therefore, the present embodiment can measure the clothing amount free from the influence of the size of the human body totally with high accuracy taking into account the factors of the material, configuration and sewing manner of the clothes.

Furthermore, the present embodiment can practically measure the clothing amount of the human being in a non-contact manner in the state in which the human being is clothed.

In the aforementioned embodiment, the human body is recognized by obtaining the differential image of two consecutive images in the image processing section 2. However, the present invention is not limited to this, and it is acceptable to detect the human body by means of a pyroelectric type infra-red ray sensor or the like.

The distance between the intersecting points of tangential lines is used for the decision of the arch shape of the head top portion in the aforementioned embodiment. However, the arch shape can be decided by other methods.

The recognition of the human body image is effected depending on whether or not the head top portion has an arch shape in the aforementioned embodiment. However, it is also acceptable to effect the recognition by any other method.

The radiation sensor 3 concurrently serves as a temperature sensor in the aforementioned embodiment. However, a temperature sensor 5 may be provided independently of the radiation sensor, as shown in FIG. 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clothing amount measuring apparatus for measuring an amount of clothes on a human body in a non-contact manner, comprising:

an image pickup section for capturing a subject in a real space;

a radiation sensor for detecting a radiation heat quantity from the real space;

an image processing section for processing an image captured by the image pickup section, and upon recognizing that the subject is a human body, detecting a position and an area of the human body in the image; and a clothing amount calculating section for calculating a thermal resistance value of the clothes on the subject as a clothing amount when the subject is a human body based on an output from the image processing section and an output from the radiation sensor.

2. The clothing amount measuring apparatus as claimed in claim 1, wherein said image processing section includes
human body image recognizing means for recognizing a human body image in an image including a human body, and
image position and area detecting means for detecting a position and an area of the human body in the recognized human body image; and said clothing amount calculating section includes
clothes surface temperature calculating means for calculating a surface temperature of the clothes based on the position and the area of the human body image and the radiation heat quantity,
skin temperature calculating means for calculating a skin temperature of the human body from information based on the human body image, and
thermal resistance calculating means for calculating a thermal resistance of the clothes as a clothing amount from the clothes surface temperature and the skin temperature of the human body.

3. The clothing amount measuring apparatus as claimed in claim 2, further comprising:

an environmental temperature acquiring section for obtaining an environmental temperature in a region to be captured by the image pickup section, wherein said clothing amount calculating section further includes
real space position and area calculating means for calculating a position and an area of the human body in the real space based on the position and the area of the human body in the human body image, and
radiation heat quantity calculating means for calculating a radiation heat quantity of only the human body based on the radiation heat quantity detected by the radiation sensor and with reference to a result of the human body image recognition executed by the image processing section, and wherein said clothes surface temperature calculating means in the clothing amount calculating section calculates the clothes surface temperature using the environmental temperature, the position and the area of the human body in the real space, and the radiation heat quantity of only the human body.

4. The clothing amount measuring apparatus as claimed in claim 2, wherein said skin temperature calculating means uses as said information a quantity of activity of the human body calculated based on the human body images captured consecutively, and calculates the skin temperature of the human body based on the quantity of activity of the human body and the environmental temperature.

5. A clothing amount measuring method comprising:

detecting an environmental temperature To;

obtaining a radiation heat quantity V of a human body based on a radiation heat quantity detected by a radiation sensor;

determining an actual position L of the human body and an area A of the human body based;

obtaining a clothes surface temperature Tcl from the environmental temperature To, the radiation heat quantity V of the human body, the position L of the human body and the area A of the human body, according to the following equation:

$$\rho(Tcl^4-To^4)=(1/C)\cdot V\cdot L^2/A$$

where σ and C are constants;

obtaining a speed of movement of the human body based on the human body image;

obtaining a quantity of activity of the human body based on the speed of movement of the human body;

obtaining an amount of increase ΔT2 of a skin temperature of the human body, based on the quantity of activity of the human body, obtaining a skin temperature Tsk of the human body from the environmental temperature To and the amount of increase ΔT2 of the skin temperature of the human body, according to the following equation:

$$Tsk=T1+a\cdot To+b\cdot \Delta T2$$

where T1, a and b are constants; and obtaining a clothes thermal resistance value Icl as a clothing amount from the environmental temperature To, the clothes surface temperature Tcl and the skin temperature Tsk of the human body, according to the following equation:

$$Icl=(Tsk-Tcl)/\{\sigma(Tcl^4-To^4)+hc(Tcl-To)\}$$

where hc is a constant.

6. The clothing amount measuring apparatus as claimed in claim 2, wherein said human body image recognizing means includes subject extracting means for extracting the subject from said image and said determining means for determining whether a head is positioned at a top of said subject, thereby recognizing said subject as a human body.

7. The clothing amount measuring apparatus as claimed in claim 6, wherein said subject extracting means includes a differential image generator calculating an absolute difference between two sequential images output by said image pickup section;

moving portion extracting means for extracting a moving portion for said absolute difference; and a comparator determining whether an area said moving portion is within a range for an area of a human being.

8. The clothing amount measuring apparatus as claimed in claim 6, wherein said head determining means includes upper edge analyzing means for determining whether an upper edge of said figure has an arch shape, thereby determining the figure has a head.

9. The clothing amount measuring apparatus as claimed in claim 8, wherein said upper edge analyzing means includes curvature varying means for determining a variation of curvature along said upper edge and determining the upper edge to be an arch when curvature varies nearly uniformly.

10. The clothing amount measuring apparatus as claimed in claim 1, further comprising:

width assigning means for setting an actual width of the head to a predetermined value; and distance determining means for determining a distance from said image pickup section to said human body in accordance with said actual width and a width measured by said image pickup section.

11. The clothing amount measuring apparatus as claimed in claim 10, further comprising height determining means for determining height of the human body in accordance with said distance and coordinates of the head on said image pickup section.

12. The clothing amount measuring apparatus as claimed in claim 11, further comprising child determining means for determining said human body is a child when said height is less than a predetermined height.

13. The clothing amount measuring apparatus according to claim 12, wherein, when said human body is determined to be a child, setting said actual width to be a predetermined child width and calculating said height in accordance with said actual width.

14. The clothing amount measuring apparatus according to claim 2, wherein said means for detecting the area of the human body includes pixel number determining means for determining a number of pixels within a contour of the human body.

15. The clothing amount measuring apparatus as claimed in claim 3, wherein said clothes surface temperature calculating means calculates said clothes surface temperature Tcl in accordance with the following equation:

$$\sigma(Tcl^4-To^4)=(1/C)\cdot V\cdot L^2/A$$

where To is the environmental temperature, V is the radiation heat quantity of the human body, L is the position of the human body, A is the area of the human body, and σ and C are constants.

16. The clothing amount measuring apparatus as claimed in claim 4, wherein said skin temperature calculating means calculates the skin temperature Tsk of the human body according to the following equation:

$$Tsk=T1+a\cdot To+b\cdot \Delta T2$$

where To is the environmental temperature and ΔT2 is the amount of increase of the skin temperature of the human body, based on the quantity of activity of the human body, and T1, a and b are constants.

17. The clothing amount measuring apparatus as claimed in claim 2, wherein said thermal resistance calculating means calculates the thermal resistance Icl according to the following equation:

$$Icl=(Tsk-Tcl)/\{\sigma(Tcl^4-To^4)+hc(Tcl-To)\}$$

where To is the environmental temperature To, Tcl is the clothes surface temperature, Tsk is the skin temperature of the human body, and hc is a constant.

18. A method for measuring an amount of clothes on a human body in a non-contact manner, comprising:

capturing an image of a subject in a real space;

detecting a radiation heat quantity from the real space; and determining whether the subject in the image is a human body in accordance with at least one of said image and said radiation heat quantity, wherein, when the subject is a human body, detecting a position and an area of the human body in the image, and calculating a thermal resistance value of the clothes on the subject as a clothing amount based on the position and area of the human body and the radiation heat quantity.

19. The method as claimed in claim 18, further comprising calculating a surface temperature of the clothes in accordance with the position and the area of the human body and the radiation heat quantity.

20. The method as claimed in claim 18, further comprising:

detecting an environmental temperature in the real space;

determining a human radiation heat quantity in accordance with the environmental temperature and the radiation heat quantity; and calculating a clothes surface temperature in accordance with the environmental temperature, the human radiation heat quantity, and the position and area of the human body.

\* \* \* \* \*